(12) United States Patent
Wang et al.

(10) Patent No.: US 9,535,685 B1
(45) Date of Patent: Jan. 3, 2017

(54) SMARTLY IDENTIFYING A VERSION OF A SOFTWARE APPLICATION FOR INSTALLATION

(71) Applicant: EMC Corporation, Hopkinton, MA (US)

(72) Inventors: Yourong Wang, Shanghai (CN); Eric Wu, Shanghai (CN); Jackson B. Myers, Cary, NC (US); Rob P. Munsell, Cary, NC (US); Brian R. Tetreault, Upton, MA (US); Daniel K. O'Reilly, Framingham, MA (US); Robert Kumlin, Wareham, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/666,980

(22) Filed: Mar. 24, 2015

(51) Int. Cl.
*G06F 9/44* (2006.01)
*G06F 9/445* (2006.01)

(52) U.S. Cl.
CPC .. *G06F 8/65* (2013.01); *G06F 8/61* (2013.01)

(58) Field of Classification Search
CPC .... G06F 1/1487; G06F 17/2288; G06F 21/57; G06F 8/61; G06F 8/64; G06F 8/71
USPC ......................................................... 717/170
See application file for complete search history.

(56) References Cited

U.S. PATENT DOCUMENTS

| 7,506,336 | B1 | 3/2009 | Ninan |
| 7,516,452 | B1 | 4/2009 | Vook et al. |
| 7,792,800 | B1 | 9/2010 | Carson, Jr. et al. |
| 7,904,652 | B1 | 3/2011 | Castelli et al. |
| 7,930,273 | B1 * | 4/2011 | Clark ........................ G06F 8/71 717/170 |
| 7,930,476 | B1 | 4/2011 | Castelli et al. |
| 8,082,330 | B1 | 12/2011 | Castelli et al. |
| 8,095,764 | B1 | 1/2012 | Bauer et al. |
| 8,151,048 | B1 | 4/2012 | Premkumar et al. |
| 8,151,077 | B1 | 4/2012 | Bauer et al. |

(Continued)

OTHER PUBLICATIONS

Segal et al. "On-the-fly program modification: systems for dynamic updating", Mar. 1993, IEEE Software, vol. 10, Issue 2.*

(Continued)

*Primary Examiner* — Wei Zhen
*Assistant Examiner* — Junchun Wu
(74) *Attorney, Agent, or Firm* — BainwoodHuang

(57) ABSTRACT

A technique identifies a version of a software application for installation on computerized equipment. The technique involves receiving an electronic communication containing a software version database which identifies different versions of the software application. The technique further involves performing an update assessment operation based on the software version database to determine whether there exists newer versions of the software application available for installation on the computerized equipment. The technique further involves providing an electronic notification to a user of the computerized equipment in response to a result of the update assessment operation indicating that there exists newer versions of the software application available for installation on the computerized equipment. The electronic notification identifies, for installation on the computerized equipment, a particular newer version of the newer versions of the software application available for installation on the computerized equipment.

17 Claims, 5 Drawing Sheets

(56) References Cited

U.S. PATENT DOCUMENTS

| | | | |
|---|---|---|---|
| 8,255,803 B1 | 8/2012 | McAdam et al. | |
| 8,326,794 B1 | 12/2012 | Wood et al. | |
| 8,375,381 B1* | 2/2013 | Clark | G06F 8/71 717/170 |
| 8,473,678 B1 | 6/2013 | Rajasekaran et al. | |
| 8,544,016 B2* | 9/2013 | Friedman | G06F 11/3664 717/107 |
| 8,700,669 B1 | 4/2014 | Glidewell et al. | |
| 8,862,550 B1 | 10/2014 | Sherry et al. | |
| 8,886,995 B1 | 11/2014 | Pallapothu et al. | |
| 9,092,290 B1 | 7/2015 | Bono et al. | |
| 2005/0055686 A1* | 3/2005 | Buban | G06F 8/65 717/170 |
| 2008/0301660 A1* | 12/2008 | Rao | G06F 8/65 717/170 |
| 2008/0301672 A1* | 12/2008 | Rao | G06F 8/61 717/177 |
| 2010/0058321 A1* | 3/2010 | Anderson | G06F 8/65 717/173 |
| 2010/0218177 A1* | 8/2010 | Miura | G06F 8/65 717/170 |
| 2011/0126192 A1* | 5/2011 | Frost | G06F 8/61 717/178 |
| 2012/0110564 A1* | 5/2012 | Ran | G06F 8/65 717/173 |
| 2014/0013318 A1* | 1/2014 | Rychikhin | G06F 8/65 717/172 |
| 2014/0122825 A1* | 5/2014 | Kono | G06F 12/023 711/170 |
| 2014/0149973 A1* | 5/2014 | Walter | G06F 8/665 717/170 |
| 2014/0237462 A1* | 8/2014 | Zheng | G06F 8/62 717/170 |
| 2014/0373001 A1* | 12/2014 | Wang | G06F 8/65 717/170 |
| 2016/0077744 A1* | 3/2016 | Pundir | G06F 3/0608 711/103 |
| 2016/0092189 A1* | 3/2016 | Pollack | G06F 8/65 717/175 |

OTHER PUBLICATIONS

Gupta et al. "A formal framework for on-line software version change", Feb. 1996, IEEE, vol. 22, Issue 2.*

Hoek et al. "Software release management for component-based software", Nov. 2002, Software: Practice and Experience, vol. 33, Issue 1.*

* cited by examiner

| Version Name Field 212 | Version Number Field 214 | Release Date Field 216 | GoTo Flag Field 218 | Obsolete Flag Field 220 | Details Field 222 | Other Fields 224 |
|---|---|---|---|---|---|---|
| Software-Aardvark-1.0 | 1.0 | Jan-13 | No | Yes | End of service life | ... |
| Software-Bear-1.1 | 1.1 | Apr-13 | No | Yes | End of service life | ... |
| Software-Camel-1.2 | 1.2 | Jul-13 | No | Yes | End of service life | ... |
| Software-Deer-2.0 | 2.0 | Oct-13 | No | Yes | Too old | ... |
| Software-Elephant-2.1 | 2.1 | Jan-14 | No | No | | ... |
| Software-Frog-2.2 | 2.2 | Apr-14 | Yes | No | | ... |
| Software-Giraffe-3.0 | 3.0 | Jul-14 | No | Yes | Stability issues | ... |
| Software-Horse-3.1 | 3.1 | Oct-14 | Yes | No | | ... |
| Software-Iguana-3.2 | 3.2 | Jan-15 | No | No | | ... |

FIG. 4

SMARTLY IDENTIFYING A VERSION OF A SOFTWARE APPLICATION FOR INSTALLATION

BACKGROUND

Conventional data storage systems manage host data on behalf of external host computers. Along these lines, the data storage systems perform host read and write operations in response to instructions from the host computers such as small computer system interface (SCSI) read and write commands.

Some conventional data storage systems are configured to routinely query their manufacturers for software updates. Accordingly, when a data storage system manufacturer releases a new software update, the data storage systems from that manufacturer can electronically inform their operators (e.g., system administrators) that the new software update is available.

SUMMARY

Unfortunately, some data storage system operators are reluctant to update the software running on their data storage systems. Along these lines, the operators may worry that the new update is unstable (i.e., may have undiscovered bugs requiring bug fixes, may have security issues, and so on). Additionally, the operators may think that the new update is "too new" thus creating incompatibility issues with other software. Furthermore, the operators may feel that their data storage systems are running well and that there is no need to perform an update even though the new update fixes a critical error or fault in the existing data storage system software, and so on. Accordingly, the operators may update their data storage system software either too soon or too late.

In contrast to the above-described situations in which operators may update their data storage system software either too soon or too late, improved computer-implemented techniques are directed to smartly identifying a version of a software application for installation on computerized equipment. Such techniques involve performing, by the computerized equipment, an update assessment operation on a software version database to determine whether newer versions of a software application are available. If so, the computerized equipment provides an electronic notification to a user (e.g., a system administrator) which identifies a particular newer version (i.e., a "GoTo" version) of the software application for installation on the computerized equipment. Based on the update assessment operation on the software version database, the computerized equipment does not identify a new version if the new version is unstable or "too new". Also, based on the update assessment operation on the software version database, the computer equipment is capable of determining whether a newer version fixes a vulnerability in the current version of the software application and, if so, informing the user of this fact thus giving the user a compelling reason to install the new version.

One embodiment is directed to a computer-implemented method of identifying a version of a software application for installation on computerized equipment. The method includes receiving an electronic communication containing a software version database which identifies different versions of the software application. The method further includes performing an update assessment operation based on the software version database to determine whether there exists newer versions of the software application available for installation on the computerized equipment. The method further includes providing an electronic notification to a user of the computerized equipment in response to a result of the update assessment operation indicating that there exists newer versions of the software application available for installation on the computerized equipment. The electronic notification identifies, for installation on the computerized equipment, a particular newer version of the newer versions of the software application available for installation on the computerized equipment.

In some arrangements, an installed version of the software application is currently installed on the computerized equipment. In these arrangements, the result of the update assessment operation indicates that a first newer version and a second newer version of the software application are available for installation on the computerized equipment, the second newer version having been released more recently than the first newer version. Here, providing the electronic notification to the user includes supplying, as the electronic notification, an electronic instruction to the user which instructs the user to install the first newer version on the computerized equipment rather than the second newer version which was released more recently that the first newer version.

In some arrangements, the method further includes, after supplying the electronic instruction to the user, receiving an upgrade command from the user to install the first newer version on the computerized equipment rather than the second newer version which was released more recently that the first newer version. Here the method further includes installing the first newer version on the computerized equipment in place of the installed version of the software application.

In some arrangements, the computerized equipment is a data storage array having an array of storage devices. In these arrangements, the method further includes performing, by the data storage array and on behalf of a set of host computers which is external to the computerized equipment, host initiated input/output (I/O) operations to store host data in and load host data from the array of storage devices while the data storage array performs the update assessment operation and provides the electronic notification to the user.

In some arrangements, receiving the electronic communication containing the software version database includes acquiring a catalogue file containing version entries identifying the different versions of the software application. Each version entry includes a version identifier which uniquely identifies a respective version of the software application.

In some arrangements, performing the update assessment operation on the software version database includes comparing a version identifier of the installed version of the software application to the version identifier of each version entry to determine whether there exists newer versions of the software application available for installation on the computerized equipment. Examples of suitable version identifiers include version numbers, release dates, and special codes, among other things.

In some arrangements, each version entry further includes a status identifier which identifies status of the respective version of the software application uniquely identified by the version identifier of that version entry. In these arrangements, supplying the electronic instruction to the user includes outputting an indication to the user to install the first newer version of the software application rather than the second newer version of the software application due to a status identifier of the version entry for the first newer version indicating that the first newer version is preferred over the second newer version.

In some arrangements, the status identifier of the version entry for the first newer version indicates that the first newer version is a "GoTo" version of the software application and the status identifier of the second newer version indicates that the second newer version is not the "GoTo" version of the software application. In these arrangements, supplying the electronic instruction to the user further includes, prior to outputting the indication to the user to install the first newer version of the software application, searching the software version database for the version entry with the status identifier indicating that the software version identified by the version identifier of that version entry is the "GoTo" version of the software application.

In some arrangements, receiving the software version database includes acquiring a catalogue file having:

(i) a first version entry which identifies a first version of the software application and indicates that the first version of the software application has reached an end of life, (ii) a second version entry which identifies a second version of the software application and indicates that the second version of the software application is too old, (iii) a third version entry which identifies a third version of the software application and indicates that the third version of the software application is a "GoTo" version of the software application which is recommended for installation on the computerized device, and (iv) a fourth version entry which identifies a fourth version of the software application and indicates that the fourth version of the software application is a newest version of the software application.

In some arrangements, an installed version of the software application is currently installed on the computerized equipment. In these arrangements, acquiring the catalogue file includes obtaining, as the third version entry, a particular version entry which identifies a version of the software application which (i) was released after the installed version of the software application was released and (ii) has been released for at least a predefined amount of time to ensure stability.

In some arrangements, an installed version of the software application is currently installed on the computerized equipment. In these arrangements, the catalogue file further includes a fifth version entry which identifies the installed version of the software application and indicates that the installed version of the software application has a known vulnerability. Here, providing the electronic notification to the user includes supplying a notice to the user indicating that the installed version of the software application has the known vulnerability.

In some arrangements, the catalogue file is sent to the computerized equipment from a catalogue file server. In these arrangements, the method further includes periodically acquiring new catalogue files from the catalogue file server to replace old catalogue files received by the computerized equipment.

Another embodiment is directed to computerized equipment which includes a communications interface, memory, and control circuitry coupled to the communications interface and the memory. The memory stores instructions which, when carried out by the control circuitry, cause the control circuitry to:

(A) receive, through the communications interface, an electronic communication containing a software version database which identifies different versions of the software application, (B) perform an update assessment operation on the software version database to determine whether there exists newer versions of the software application available for installation on the computerized equipment, and (C) provide an electronic notification to a user of the computerized equipment in response to a result of the update assessment operation indicating that there exists newer versions of the software application available for installation on the computerized equipment.

The electronic notification identifies, for installation on the computerized equipment, a particular newer version of the newer versions of the software application available for installation on the computerized equipment.

Yet another embodiment is directed to a computer program product having a non-transitory computer readable medium which stores a set of instructions to identify a version of a software application for installation on computerized equipment. The set of instructions, when carried out by the computerized equipment, causes the computerized equipment to perform a method of:

(A) receiving an electronic communication containing a software version database which identifies different versions of the software application;

(B) performing an update assessment operation on the software version database to determine whether there exists newer versions of the software application available for installation on the computerized equipment; and (C) providing an electronic notification to a user of the computerized equipment in response to a result of the update assessment operation indicating that there exists newer versions of the software application available for installation on the computerized equipment.

The electronic notification identifies, for installation on the computerized equipment, a particular newer version of the newer versions of the software application available for installation on the computerized equipment.

It should be understood that, in the cloud context, certain electronic circuitry such as the catalogue file server is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in smartly identifying a version of a software application for installation.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 4 is a block diagram of an example catalogue file.

DETAILED DESCRIPTION

An improved technique is directed to a technique which smartly identifies a version of a software application for installation on computerized equipment. Such a technique involves performing an update assessment operation on the software version database by computerized equipment to determine whether there are newer versions of the software application available. If so, the computerized equipment provides an electronic notification to a user (e.g., a system administrator) which identifies a particular newer version of the software application for installation on the computerized equipment. Based on the update assessment operation on the software version database, the computerized equipment does not identify a new version if the new version is unstable or "too new". Also, based on the update assessment operation, the computer equipment is capable of determining whether a newer version fixes a vulnerability in the current version of the software application and, if so, informing the user of the urgency to install the new version.

Figure 1:
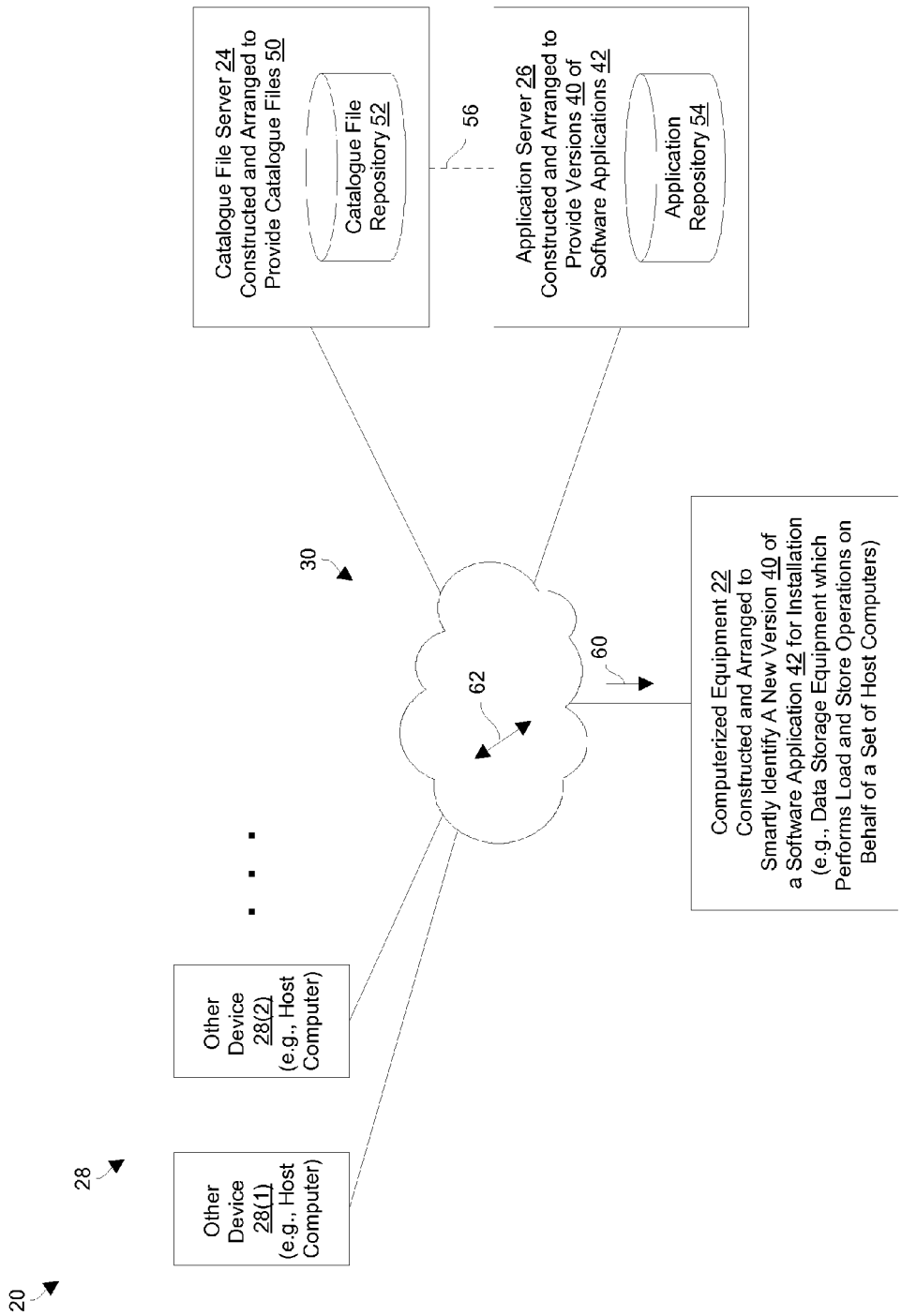
FIG. 1 is a block diagram of an electronic environment having computerized equipment which smartly identifies a version of a software application for installation.

FIG. 1 shows an electronic environment 20 which is suitable for smart identification of software versions for installation. The electronic environment 20 includes computerized equipment 22, a catalogue file server 24, an application server 26, other devices 28(1), 28(2), . . . (collectively, other devices 28), and communications medium 30.

The computerized equipment 22 is constructed and arranged to perform useful work. For example, the computerized equipment 22 may be a data storage array having an array of storage devices to manage host data. As will be explained in further detail shortly, the computerized equipment 22 smartly identifies a new version 40 of a software application 42 for installation thus enabling a user to avoid installing versions too soon or too late.

The catalogue file server 24 is constructed and arranged to provide catalogue files 50 which identify different versions 40 of the software application 42 as new versions 40 of the software application 42 become available over time. To this end, the catalogue file server 24 maintains a catalogue file repository 52 to store the catalogue files 50.

The application server 26 is constructed and arranged to provide the different versions 40 of the application 42 upon request. To this end, the application server 26 maintains an application repository 54 to store the different versions 40 of the application 42 as the new versions 40 of the software application 42 become available over time. It should be understood that the versions 40 may be substantially complete applications or programs, smaller upgrades or updates, combinations thereof, and so on. It should be further understood that a communications channel 56 exists between the catalogue file server 24 and the application server 26 to enable the catalogue file server 24 to read software information from the application server 26 and generate the catalogue files 50.

The other devices 28 are provided for illustration purposes. Along these lines, if the computerized equipment 22 is a data storage array, the other devices 28 may represent external host computers which provide data storage commands 60 to store host data in the data storage array, and load host data from the data storage array to perform useful work.

The communications medium 30 is constructed and arranged to connect the various components of the electronic environment 20 together to enable these components to exchange electronic signals 62 (e.g., see the double arrow 62). At least a portion of the communications medium 30 is illustrated as a cloud to indicate that the communications medium 30 is capable of having a variety of different topologies including backbone, hub-and-spoke, loop, irregular, combinations thereof, and so on. Along these lines, the communications medium 30 may include copper-based data communications devices and cabling, fiber optic communications devices and cabling, wireless communications devices, combinations thereof, etc. Furthermore, the communications medium 30 is capable of supporting LAN-based communications, SAN-based communications, cellular communications, combinations thereof, etc. In some arrangements, host computers connect with the computerized equipment 22 via a local area network (LAN), while the catalogue file server 24 and the application server 26 connect via a wide area network (WAN).

During operation, the computerized equipment 22 performs useful work such as performing host initiated input/output (I/O) operations on behalf of host computers. Concurrently, the computerized equipment 22 periodically communicates with the catalogue file server 24 to determine whether it is appropriate to install a new version 40 of a software application 42 running on the computerized equipment 22.

To make such a determination, the computerized equipment 22 receives, as a software update database, a catalogue file 50 which identifies different software application versions 40 of the software application 42 from the catalogue file server 24. The computerized equipment 22 then performs an assessment operation on the catalogue file 50 to determine whether and there exists any newer versions 40 of the software application 42 currently available for installation on the computerized equipment 22. If so, the computerized equipment 22 provides an electronic notification to the user (e.g., an electronic prompt offering to upgrade the current version 40 of the software application 42). Along these lines, if there are multiple newer versions 40 of the software application 42 available for installation on the computerized equipment 22, the electronic notification identifies a particular or preferred newer version 40 for installation.

If the user decides to install the particular newer version 40 (or perhaps a different version 40), the user enters an installation instruction into the computerized equipment 22. The installation instruction then directs the computerized equipment 22 to retrieve the version 40 of the software application 42 from the application server 26 and then install that version 40.

It should be understood the electronic environment 20 is capable of including multiple instances of the computerized equipment 22. In such a situation, each instance is capable of operating as explained above (e.g., communicating with catalogue file server 24 to obtain a catalogue file 50, determining whether to install a newer version 40 of the software application 42, and communicating with the application server 26 to obtain that newer version 40 of the software application 42, and so on). Further details will now be provided with reference to FIG. 2.

Figure 2:
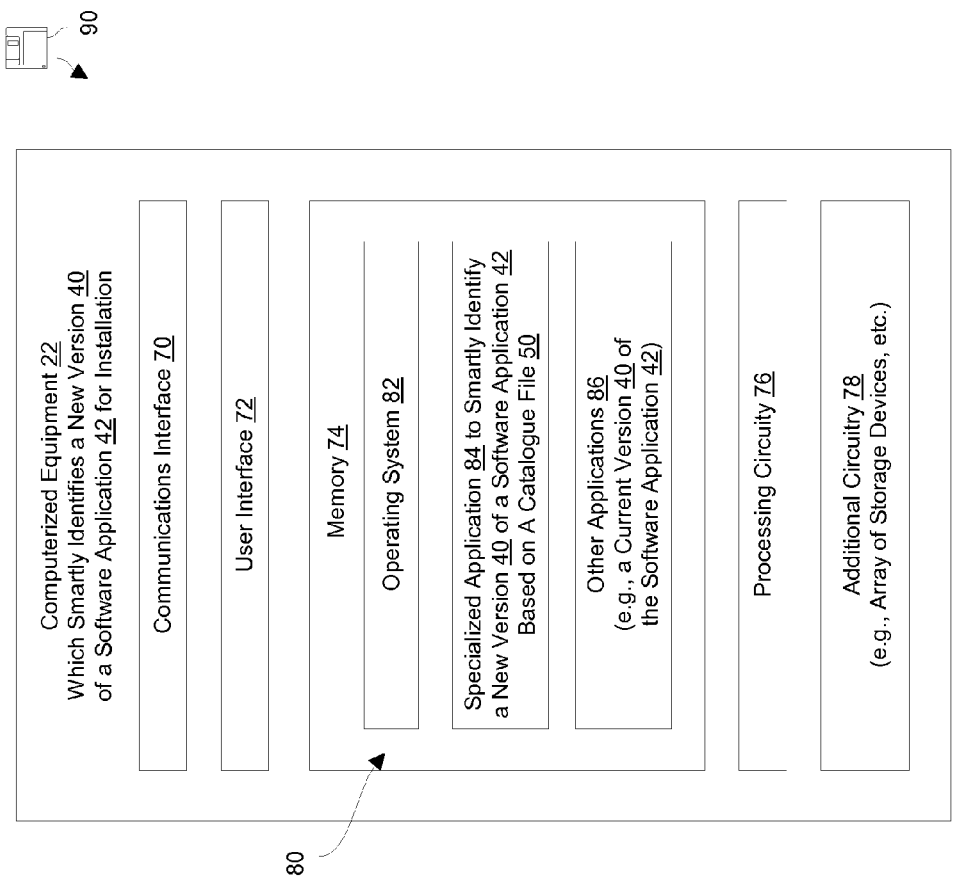
FIG. 2 is a block diagram of computerized equipment of FIG. 1.

FIG. 2 shows particular details of an instance of the computerized equipment 22 of FIG. 1. The computerized equipment 22 includes a communications interface 70, a user interface 72, memory 74, processing circuitry 76, and additional circuitry 78.

The communications interface 70 is constructed and arranged to connect the computerized equipment 22 to the communications medium 30 to enable communications with other components of the electronic environment 20 (FIG. 1). Such communications may be IP-based, cellular-based, cable-based, fiber-optic based, wireless, combinations thereof, and so on. Accordingly, the communications interface 70 enables the computerized equipment 22 to robustly and reliably communicate with the devices such as the catalogue file server 24, the application server 26, and the other devices 28.

The user interface 72 is constructed and arranged to receive user input from, and provide user output to a user of the computerized equipment 22. In the context of stationary equipment such as a data storage array, the user interface 72 can include a keyboard, a mouse, an electronic display or monitor, and so on.

The memory 74 is intended to represent both volatile storage (e.g., DRAM, SRAM, etc.) and non-volatile storage (e.g., flash memory, etc.). The memory 74 stores a variety of software constructs 80 including an operating system 82 to manage resources of the computerized equipment 22, a specialized application 84 to smartly identify a new version 40 of a software application 42 for installation, and other applications 86 (e.g., a current version 40 of the software application 42).

The processing circuitry 76 is constructed and arranged to operate in accordance with the various software constructs 80 stored in the memory 74. Such processing circuitry 76 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software constructs 80 to the computerized equipment 22. In particular, the computer program product 90 has a non-transitory (or non-volatile) computer readable medium which stores a set of instructions which controls one or more operations of the computerized equipment 22. Examples of suitable computer readable storage media include tangible articles of manufacture and apparatus which store instructions in a non-volatile manner such as CD-ROM, flash memory, disk memory, tape memory, and the like.

The additional circuitry 78 represents other electronic portions of the computerized equipment 22. Along these lines, in the context of a data storage array, the additional circuitry 78 includes one or more arrays of storage devices (e.g., disk array enclosures or DAEs, etc.).

During operation, the computerized equipment 22 performs useful work. For example, the processing circuitry 76 executes a current version 40 of the software application 42 to form storage processing circuitry which stores host data into and loads host data from an array of storage devices on behalf of a set of external host computers (also see the other devices 28 in FIG. 1).

During such operation, the processing circuitry 76 further executes the specialized application 84 to form specialized control circuitry which periodically receives a catalogue file 50 from the catalogue file server 24 and evaluates the catalogue file 50 to determine whether to identify a newer version 40 of the software application 42 for installation. Such version evaluation may take place in accordance with a set schedule (e.g., hourly, daily, weekly, monthly, yearly, based on a predefined calendar, based on customized dates/times, and so on).

It should be understood that a variety of software applications 42 are suitable for evaluation in the above-described manner. For example, in addition to the other applications 86 which enable the computerized equipment 22 to perform a primary purpose or a main set of operations, the same evaluation is suitable for determining whether to install a new version of the operating system 82, firmware which loads the operating system 82, tools and/or utilities, and so on. Further details will now be provided with reference to FIG. 3.

Figure 3:
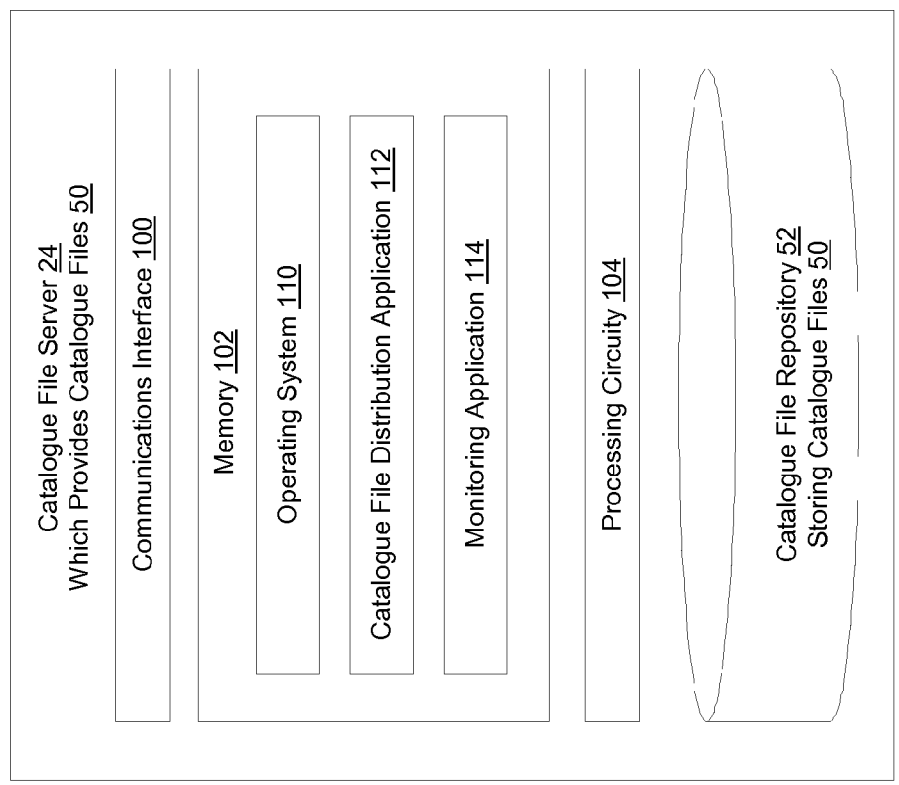
FIG. 3 is a block diagram of a catalogue file server of FIG. 1.

FIG. 3 shows particular details of the catalogue file server 24 of FIG. 1. The catalogue file server 24 includes a communications interface 100, memory 102, processing circuitry 104, and a catalogue file repository 52.

The communications interface 100 is constructed and arranged to connect the catalogue file server 24 to the communications medium 30 to enable communications with other components of the electronic environment 20 (FIG. 1). Accordingly, the catalogue file server 24 is able to read software information from the application server 26, and supply catalogue files 50 to various computerized equipment 22 of the electronic environment 20.

The memory 102 is intended to represent both volatile storage (e.g., DRAM, SRAM, etc.) and non-volatile storage (e.g., flash memory, etc.). The memory 104 stores a variety of software constructs including an operating system 110 to manage resources of the catalogue file server 24, a catalogue file distribution application 112 to distribute the catalogue files 50 to instances of the computerized equipment 22, and a monitoring application 114 to periodically communicate with the application server 26 to determine whether a new version 40 of the software application 42 is available (FIG. 1).

The processing circuitry 104 is constructed and arranged to operate in accordance with the various software constructs stored in the memory 102. In particular, the processing circuitry 76 executes the catalogue file distribution application 112 to form specialized control circuitry which distributes catalogue files 50 to instances of the computerized equipment 22. Additionally, the processing circuitry 76 executes the monitoring application 114 to synchronize its software version information with the application server 26.

The catalogue file repository 52 stores the catalogue files 50. As will be explained in further detail shortly, each catalogue file 50 is a software version database which holds the version information regarding the software application 42.

During operation, the catalogue file server 24 provides catalogue files 50 to instances of computerized equipment 22. In some arrangements, the catalogue file server 24 provides different catalogue files 50 for different software applications 42 (e.g., for more than one type of equipment or platform, for operating systems/management software/utilities/tools/etc., and so on). Further details will now be provided with reference to FIG. 4.

FIG. 4 shows an example catalogue file 50 which is suitable for use in smartly identifying a new version 40 of a software application 42 for installation on computerized equipment 22. In particular, the computerized equipment 22 periodically receives a new catalogue file 50 by requesting the new catalogue file 50 from the catalogue file server 24, or by the catalogue file server 24 automatically sending the new catalogue file 50 to the computerized equipment 22.

The computerized equipment 22 then performs an update assessment operation to determine whether to notify a user of the computerized equipment 22 to install a new version 40 of the software application 42.

As shown in FIG. 4, the catalogue file 50 includes multiple catalogue file entries 200(1), 200(2), 200(3), . . . (collectively, catalogue file entries 200). Each catalogue file entry 200 corresponds to a respective version 40 of the software application 42. To this end, each catalogue file entry 200 includes a variety of fields 210 to describe a particular version 40 of the software application 42. In particular, each catalogue file entry 200 includes a version name field 212, a version number field 214, a release date field 216, a "GoTo" flag field 218, an obsolete flag field 220, a details field 222, and other fields 224.

The version name fields 212 of the catalogue file entries 200 hold unique version names of different versions 40 of the software application 42. Similarly, the version number fields 212 of the catalogue file entries 200 hold unique version numbers of the different versions 40 of the software application 42. The release date fields 216 of the catalogue entries 200 hold release date information identifying the release dates of the different versions 40 of the software application 42. Either the version names, the version numbers, the release dates, or combinations thereof are suitable for use as version identifiers for uniquely identifying the different versions 40.

The "GoTo" flag fields 218 of the catalogue file entries 200 hold flags (or values) indicating which of the different versions 40 of the software application 42 is a "GoTo" version of the software application 42. The "GoTo" version is a preferred version of the software application 42 which is recommended for running on the computerized equipment 22.

In some arrangements, there is exactly one version 40 of the software application 42 which is identified as the "GoTo" version. In these arrangements, the "GoTo" version may be one of the more recent versions 40 of the software application 42, but also one which has been in available (e.g., released and supported) for at least a predefined period of time and which is known to be stable. Accordingly, the user of the computerized equipment 22 should have confidence that upgrading an older version currently running on the computerized equipment 22 to the "GoTo" version will not cause any significant issues. Rather, upgrading to the "GoTo" version may cure vulnerabilities, may have the strongest security, may have little or no support issues with other applications currently running on the computerized equipment 22, and so on.

In other arrangements, there may be multiple "GoTo" versions identified by the catalogue file 50. As long as the computerized equipment is currently running a "GoTo" version, the user should consider the computerized equipment 22 as running a preferred version of the software application 42 with little or no urgency to upgrade. However, in some arrangements, if there is a newer "GoTo" version of the software application 42 available, the computerized equipment 22 still notifies the user of the availability of the newer "GoTo" version.

The obsolete flag fields 220 of the catalogue file entries 200 hold flags (or values) indicating which of the different versions 40 of the software application 42 are obsolete. That is, if a version 40 has its obsolete flag set, the supplier of the software application 42 has obsoleted that version 40.

The details fields 222 of the catalogue file entries 200 hold particular descriptive data which assists the user in understanding the appropriateness of the different versions 40 of the software application 42. For example, "end of service life" can be used to inform the user that particular versions 40 have been retired, i.e., are no longer supported and considered obsolete. As another example, "too old" can be used to inform the user that, although the particular versions 40 are still supported of the software application 42, such versions 40 are not considered appropriate or acceptable perhaps due to the existence of significantly superior versions 40. As yet another example, "known stability issues" can be used to warn the user that particular versions 40 have significant issues and should no longer be used, and so on. Such descriptive data thus automatically educates the user with compelling reasons to install a new version 40 of the software application 42.

The other fields 224 of the catalogue file entries 200 store other information for the different versions 40 of the software application 42. Examples of such other information includes listings of new features for the different versions 40, listings of requirements for the different versions 40 (e.g., hardware requirements, updates and/or versions of other software required for proper operation, etc.), applicable platforms to handle situations in which certain versions can only be installed on certain platforms, and so on.

Although the catalogue file 50 is illustrated as a table of rows and columns, it should be understood that the catalogue file 50 may have other formats, e.g., a relational database, an XML database, and so on. Additionally, other fields are suitable for use as well. Accordingly, the catalogue file 50 richly and robustly operates as software version database.

As is shown in FIG. 4, the Elephant, Frog, Horse and Iguana versions of the software application 42 are all acceptable, i.e., they do not have their obsolete flags set. Additionally, the Frog and Horse versions are the recommended versions of the software application 42 to the computerized equipment 22 will electronically notify the user if one of the other versions is currently installed.

Further details will now be provided with reference to an example which refers to the example catalogue file 50 of FIG. 4. In this example, suppose that the user of the computerized equipment 22 has the particular version 40 named "Software-Giraffe-3.0" currently installed and running. Perhaps the user has been using this particular version 40 for some time and is not currently aware that the supplier has obsoleted this version 40 and that there are known stability issues with this version 40 (see the detail fields 220 in FIG. 4).

During operation, the specialized application 84 is periodically executed on the computerized equipment 22 (FIG. 2) to smartly identify whether a newer version 40 of the software application 42 should be installed on the computerized equipment 22. The processing circuitry 86 of the computerized equipment 22 running the specialized application 84 then forms specialized control circuitry which acquires a catalogue file 50 from the catalogue file server 26. In some arrangements, the control circuitry periodically requests a new catalogue file 50 from the catalogue file server 26 (e.g., once an hour, once a day, once a week, once a month, etc.). In other arrangements, the control circuitry monitors for new catalogue files 50, and the catalogue file server 50 periodically distributes a new catalogue file 50 to the computerized equipment 22 (e.g., daily, weekly, when a new version 40 of the software application 42 becomes available, etc.).

In response to receipt of the new catalogue file 50, the control circuitry performs an update assessment operation which compares the current version 40 of the software application 42 with the catalogue file entries 200 of the catalogue file 50. Such operation determines whether there are any newer versions 40 of the software application 42 which are currently available. In the example (see FIG. 4), there are multiple newer versions 40 of the software application 42, namely, "Software-Horse-3.1" and "Software-Iguana-3.2". Here, it should be understood that just the knowledge that there is at least one newer version 40 of the software application 42 available may not be enough to persuade the user to upgrade to one of the newer versions 40.

However, in the example, the specialized control circuitry provides the user with an electronic notification indicating that there are multiple newer versions 40 of the software application 42. Moreover, the electronic notification indicates that, even if the current version 40 of the software application 42 used to be the "GoTo" version of the software application 42, it is no longer the "GoTo" version 40 according to the update assessment operation performed on the software version database 50. Rather, there is a newer "GoTo" version of the software application 42 which is available even though the newer "GoTo" version is not the newest version available (recall that the "GoTo" version is a version 40 that has been released for a period of time and known to be stable). Moreover, the electronic notification further informs the user that the supplier has deemed the current version installed on the computerized equipment 22 to be obsolete and that there are known stability issues with the current version thus providing a compelling reason for the user to perform an upgrade to the newer "GoTo" version. Accordingly, the user does not defer replacing the current version with a more suitable version. Instead, the user now understands the significance of the upgrade and is able to install the newer "GoTo" version of the software application 42 to maintain reliable operation and safeguard the computerized equipment 22.

Based on such operation, the user is directed to install at least the "Software-Horse-3.1" version of the software application 42 even though that version is not the newest version. Rather, the "Software-Horse-3.1" version is the newer "GoTo" version, i.e., a version 40 of the software application 42 which has been available for an established period of time (e.g., at least three months, six months, nine months, a year, etc.) and which is known to be stable. Accordingly, the user does not need to worry that the user would be one of the first people to install the newest version 40 of the software application 42 which may have unknown but soon to be discovered issues (e.g., software bugs, incompatibility issues, security concerns, etc.).

At this point, it should be appreciated that the Elephant and Frog versions are older than the current version (Giraffe), but that they are less than a year old, they are not at their end of life, and they do not have any known stability issues. Additionally, Iguana is the newest version and acceptable, but it is too new to be the "GoTo" version. To install a new version 40 of the software application 42, the user directs the computerized equipment 22 to obtain the new version 40 from the application server 26 (FIG. 1) and perform an installation routine. Further details will now be provided with reference to FIG. 5.

Figure 5:
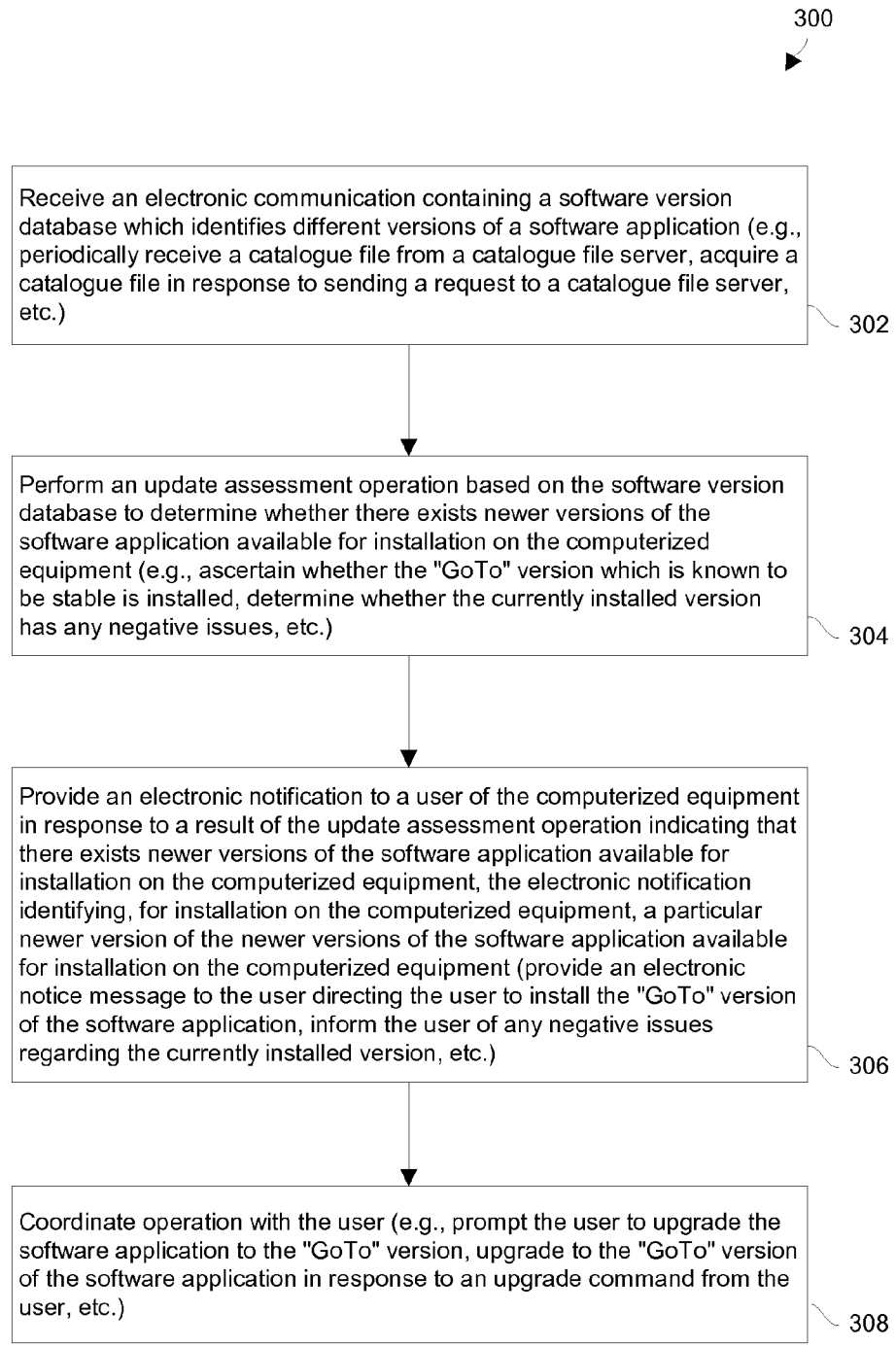
FIG. 5 is a flowchart of a procedure which is performed by the computerized equipment of FIG. 1.

FIG. 5 is a flowchart of a procedure 300 which is performed by computerized equipment 22 to smartly identify a version of a software application for installation on the computerized equipment 22. At 302, the computerized equipment 22 receives an electronic communication containing a software version database which identifies different versions of the software application (e.g., see the catalogue file 50 in FIG. 4). In particular, each entry of the software version database describes a particular version of the software application. In some arrangements, the computerized equipment 22 periodically requests a new catalogue file 50 from the catalogue file server 24 to "pull" new catalogue files 50 from the catalogue file server 24. In other arrangements, the computerized equipment 22 automatically receives new catalogue files 50 which are "pushed" from the catalogue file server 24.

At 304, the computerized equipment 22 performs an update assessment operation based on the software version database to determine whether there exists newer versions of the software application available for installation on the computerized equipment 22. Along these lines, the computerized equipment 22 ascertains whether the "GoTo" version of the software application is currently installed based on a comparison of the currently installed version to the software version database. Additionally, the computerized equipment 22 compares the currently installed version to the software version database to determine whether there are any known issues with the currently installed version. Such analysis can be based on comparisons between version identification data such as version names, version release dates, version numbers, combinations thereof, etc.

At 306, the computerized equipment 22 provides an electronic notification to a user of the computerized equipment 22 in response to a result of the update assessment operation indicating that there exists newer versions of the software application available for installation on the computerized equipment 22. The electronic notification identifies, for installation on the computerized equipment 22, a particular newer version of the newer versions of the software application available for installation on the computerized equipment 22. Here, the user is informed of any need to install a new version of the software application, e.g., known issues of instability with the currently installed version, etc.

At 308, the computerized equipment 22 coordinates operation with the user. Along these lines, the computerized equipment 22 can prompt the user for an upgrade command to upgrade to a newer version of the software application such as the "GoTo" version, the computerized equipment 22 can receive an upgrade or install command directing the computerized equipment 22 to upgrade the currently installed version of the software application, and so on. In some arrangements, the user is able to query the catalogue file 50 for details regarding particular versions in order to make a well-informed upgrade decision. Along these lines, if there is a version of the software application available which is newer than the "GoTo" version, the user can decide whether the situation is appropriate to install that newer version. For example, if the computerized equipment 22 is a production system, the user may consider that newer version to be "too new". However, if the computerized equipment 22 is a test system, the user may deem it appropriate to install that newer version.

It should be understood that the procedure 300 is repeated periodically. Furthermore, the user can direct the computerized equipment 22 to install a new version of the software application at any point, e.g., immediately upon notification, during downtime, and so on.

As described above, improved computer-implemented techniques are directed to smartly identifying a version 40 of a software application 42 for installation on computerized equipment 22. Such techniques involve performing an update assessment operation on a software version database by the computerized equipment 22 to determine whether newer versions of a software application 42 are available. If so, the computerized equipment 22 provides an electronic notification to a user (e.g., a system administrator) which identifies a particular newer version 40 of the software application 42 for installation on the computerized equipment. Based on the update assessment operation on the software version database, the computerized equipment 22 does not identify a new version if the new version is unstable or "too new". Also, based on the update assessment operation on the software version database, the computer equipment 22 is capable of determining whether a new version fixes a vulnerability in the current version of the software application and, if so, informing the user of that fact thus giving the user a compelling reason to install the new version.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic environment 20 such as the servers are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, it should be understood that the user interface 72 of the computerized equipment 22 was described above as including a keyboard, a mouse, a monitor, etc. by way of example only. In other arrangements, the user interface 72 may be portable and/or wireless. For example, the user interface 72 may include a touchscreen such as that of a smart phone or tablet device so that the user provides input in the form of user touches, as well as other types of user gestures (e.g., swiping motions, multi-finger traces, etc.).

Furthermore, one should appreciate that the above-described techniques are well-suited for delivery of service reminders for non-target code. That is, certain techniques deliver notification to users when their computerized equipment is not running the latest software and strongly encourages them to upgrade to the most recent version. To this end, a particular technique uses a catalog file, which has details about each software version that is available to be installed. The catalog file has entries for the latest software, but not all users may want to upgrade their equipment to the absolute most recent software until it has been released for a while. Therefore, the catalog file includes a designation called the "GoTo" version, which refers a software release that has been available for a period of time and is known to be stable. Moreover, the catalog files also have information about older software releases, which are no longer the recommended versions. That information includes the release date to enable detection of software that has been released longer than a given period of time in the past can be marked as "too old". Each older software release can be given a customized message as to why the user should upgrade to a more recent version (e.g., even if it is not being marked as "too old"). For example, it could be marked as "having known issues", "end of service life", and so on.

In conventional approaches to upgrading software, the end user does not know which version was recommended if there were multiple possible upgrades available, or why old versions were no longer recommended. Accordingly, the end user is very likely to delay upgrades or take no action at all without being given a compelling reason to upgrade away from software that has been in use for a while and appears to be satisfactory.

However, with the improved techniques disclosed herein, users obtain recommendations of what they should install onto their computerized equipment (e.g., a storage system) and why the upgrade is important. Along these lines, a customized message can allow the users to know if the known issues apply to them so that they know how urgent the upgrade is needed. Such techniques prevent the users from succumbing to drawbacks in the already installed software by informing the user about vulnerabilities they wouldn't have otherwise known about until it was too late.

Accordingly, one will appreciate that the above-described techniques amount to more than simply recommending that the user upgrade a software application. Rather, such techniques smartly identify a particular version of a software application for installation on computerized equipment via delivery of a specialized software version database to the computerized equipment. Such modifications and enhancements are intended to belong to various embodiments of the disclosure.

What is claimed is:

1. A computer-implemented method of identifying a version of a software application for installation on computerized equipment, the method comprising:
   receiving, by the computerized equipment, an electronic communication containing a software version database which identifies different versions of the software application;
   performing, by the computerized equipment, an update assessment operation based on the software version database to determine whether there exists newer versions of the software application available for installation on the computerized equipment; and
   providing, by the computerized equipment, an electronic notification to a user of the computerized equipment in response to a result of the update assessment operation indicating that there exists newer versions of the software application available for installation on the computerized equipment, the electronic notification identifying, for installation on the computerized equipment, a particular newer version of the newer versions of the software application available for installation on the computerized equipment;
   wherein an installed version of the software application is currently installed on the computerized equipment;
   wherein the result of the update assessment operation indicates that a first newer version and a second newer version of the software application are available for installation on the computerized equipment, the second newer version having been released more recently than the first newer version;
   wherein providing the electronic notification to the user includes:
      supplying, as the electronic notification, an electronic instruction to the user which instructs the user to install the first newer version on the computerized equipment rather than the second newer version which was released more recently that the first newer version;
wherein the method further comprises:
    after supplying the electronic instruction to the user, receiving an upgrade command from the user to install the first newer version on the computerized equipment rather than the second newer version which was released more recently that the first newer version, and installing the first newer version on the computerized equipment in place of the installed version of the software application to upgrade the software application;
wherein the computerized equipment is a data storage array having an array of storage devices;
wherein the method further comprises:
    performing, on behalf of a set of host computers which is external to the computerized equipment, host initiated input/output (I/O) operations to store host data in and load host data from the array of storage devices while the computerized equipment performs the update assessment operation and provides the electronic notification to the user; and
wherein receiving the electronic communication containing the software version database includes:
    acquiring a catalogue file containing version entries identifying the different versions of the software application, each version entry including a version identifier which uniquely identifies a respective version of the software application.

2. A method as in claim 1 wherein an installed version of the software application is currently installed on the computerized equipment; and wherein performing the update assessment operation on the software version database includes:
    comparing a version identifier of the installed version of the software application to the version identifier of each version entry to determine whether there exists newer versions of the software application available for installation on the computerized equipment.

3. A method as in claim 2 wherein each version entry further includes a status identifier which identifies status of the respective version of the software application uniquely identified by the version identifier of that version entry; wherein supplying the electronic instruction to the user includes:
    outputting an indication to the user to install the first newer version of the software application rather than the second newer version of the software application due to a status identifier of the version entry for the first newer version indicating that the first newer version is preferred over the second newer version.

4. A computer-implemented method of identifying a version of a software application for installation on computerized equipment, the method comprising:
    receiving, by the computerized equipment, an electronic communication containing a software version database which identifies different versions of the software application;
    performing, by the computerized equipment, an update assessment operation based on the software version database to determine whether there exists newer versions of the software application available for installation on the computerized equipment; and
    providing, by the computerized equipment, an electronic notification to a user of the computerized equipment in response to a result of the update assessment operation indicating that there exists newer versions of the software application available for installation on the computerized equipment, the electronic notification identifying, for installation on the computerized equipment, a particular newer version of the newer versions of the software application available for installation on the computerized equipment;
wherein an installed version of the software application is currently installed on the computerized equipment;
wherein the result of the update assessment operation indicates that a first newer version and a second newer version of the software application are available for installation on the computerized equipment, the second newer version having been released more recently than the first newer version;
wherein providing the electronic notification to the user includes:
    supplying, as the electronic notification, an electronic instruction to the user which instructs the user to install the first newer version on the computerized equipment rather than the second newer version which was released more recently that the first newer version;
wherein receiving the electronic communication containing the software version database includes:
    acquiring a catalogue file containing version entries identifying the different versions of the software application, each version entry including a version identifier which uniquely identifies a respective version of the software application;
wherein performing the update assessment operation on the software version database includes:
    comparing a version identifier of the installed version of the software application to the version identifier of each version entry to determine whether there exists newer versions of the software application available for installation on the computerized equipment;
wherein each version entry further includes a status identifier which identifies status of the respective version of the software application uniquely identified by the version identifier of that version entry; wherein supplying the electronic instruction to the user includes:
    outputting an indication to the user to install the first newer version of the software application rather than the second newer version of the software application due to a status identifier of the version entry for the first newer version indicating that the first newer version is preferred over the second newer version; and
wherein the status identifier of the version entry for the first newer version indicates that the first newer version is a "GoTo" version of the software application and the status identifier of the second newer version indicates that the second newer version is not the "GoTo" version of the software application; and wherein supplying the electronic instruction to the user further includes:
    prior to outputting the indication to the user to install the first newer version of the software application, searching the software version database for the version entry with the status identifier indicating that the software version identified by the version identifier of that version entry is the "GoTo" version of the software application.

5. A computer-implemented method of identifying a version of a software application for installation on computerized equipment, the method comprising:
    receiving, by the computerized equipment, an electronic communication containing a software version database which identifies different versions of the software application;

performing, by the computerized equipment, an update assessment operation based on the software version database to determine whether there exists newer versions of the software application available for installation on the computerized equipment; and providing, by the computerized equipment, an electronic notification to a user of the computerized equipment in response to a result of the update assessment operation indicating that there exists newer versions of the software application available for installation on the computerized equipment, the electronic notification identifying, for installation on the computerized equipment, a particular newer version of the newer versions of the software application available for installation on the computerized equipment;

wherein receiving the software version database includes:
acquiring a catalogue file having
(i) a first version entry which identifies a first version of the software application and indicates that the first version of the software application has reached an end of life,
(ii) a second version entry which identifies a second version of the software application and indicates that the second version of the software application is too old,
(iii) a third version entry which identifies a third version of the software application and indicates that the third version of the software application is a "GoTo" version of the software application which is recommended for installation on the computerized device, and
(iv) a fourth version entry which identifies a fourth version of the software application and indicates that the fourth version of the software application is a newest version of the software application.

6. A method as in claim 5 wherein an installed version of the software application is currently installed on the computerized equipment; and wherein acquiring the catalogue file includes:
obtaining, as the third version entry, a particular version entry which identifies a version of the software application which (i) was released after the installed version of the software application was released and (ii) has been released for at least a predefined amount of time to ensure stability.

7. A method as in claim 5 wherein an installed version of the software application is currently installed on the computerized equipment; wherein the catalogue file further includes a fifth version entry which identifies the installed version of the software application and indicates that the installed version of the software application has a known vulnerability; and wherein providing the electronic notification to the user includes:
supplying a notice to the user indicating that the installed version of the software application has the known vulnerability.

8. A method as in claim 5 wherein the catalogue file is sent to the computerized equipment from a catalogue file server; and wherein the method further comprises:
periodically acquiring new catalogue files from the catalogue file server to replace old catalogue files received by the computerized equipment.

9. Computerized equipment, comprising:
a communications interface;
memory; and control circuitry coupled to the communications interface and the memory, the memory storing instructions which, when carried out by the control circuitry, cause the control circuitry to:
receive, through the communications interface, an electronic communication containing a software version database which identifies different versions of a software application,
perform an update assessment operation on the software version database to determine whether there exists newer versions of the software application available for installation on the computerized equipment, and
provide an electronic notification to a user of the computerized equipment in response to a result of the update assessment operation indicating that there exists newer versions of the software application available for installation on the computerized equipment, the electronic notification identifying, for installation on the computerized equipment, a particular newer version of the newer versions of the software application available for installation on the computerized equipment;

wherein the control circuitry, when receiving the electronic communication containing the software version database, is constructed and arranged to:
acquire a catalogue file containing version entries identifying the different versions of the software application, each version entry including a version identifier which uniquely identifies a respective version of the software application; and wherein the catalogue file has:
(i) a first version entry which identifies a first version of the software application and indicates that the first version of the software application has reached end of life,
(ii) a second version entry which identifies a second version of the software application and indicates that the second version of the software application is too old,
(iii) a third version entry which identifies a third version of the software application and indicates that the third version of the software application is a "GoTo" version of the software application which is recommended for installation on the computerized device, and
(iv) a fourth version entry which identifies a fourth version of the software application and indicates that the fourth version of the software application is a newest version of the software application.

10. Computerized equipment as in claim 9 wherein an installed version of the software application is currently installed on the computerized equipment; wherein the result of the update assessment operation indicates that a first newer version and a second newer version of the software application are available for installation on the computerized equipment, the second newer version having been released more recently than the first newer version; and wherein the control circuitry, when providing the electronic notification to the user, is constructed and arranged to:
supply, as the electronic notification, an electronic instruction to the user which instructs the user to install the first newer version on the computerized equipment rather than the second newer version which was released more recently that the first newer version.

11. Computerized equipment as in claim 10 wherein the control circuitry is further constructed and arranged to:

after supplying the electronic instruction to the user, receive an upgrade command from the user to install the first newer version on the computerized equipment rather than the second newer version which was released more recently that the first newer version, and install the first newer version on the computerized equipment in place of the installed version of the software application to upgrade the software application.

12. Computerized equipment as in claim 11, further comprising:
an array of storage devices to store host data; and
wherein the control circuitry is further constructed and arranged to:
perform, on behalf of a set of host computers which is external to the computerized equipment, host initiated input/output (I/O) operations to store host data in and load host data from the array of storage devices while the control circuitry performs the update assessment operation and provides the electronic notification to the user.

13. A computer program product having a non-transitory computer readable medium which stores a set of instructions to identify a version of a software application for installation on computerized equipment, the set of instructions, when carried out by the computerized equipment, causing the computerized equipment to perform a method of:
receiving an electronic communication containing a software version database which identifies different versions of the software application;
performing an update assessment operation on the software version database to determine whether there exists newer versions of the software application available for installation on the computerized equipment; and
providing an electronic notification to a user of the computerized equipment in response to a result of the update assessment operation indicating that there exists newer versions of the software application available for installation on the computerized equipment, the electronic notification identifying, for installation on the computerized equipment, a particular newer version of the newer versions of the software application available for installation on the computerized equipment;
wherein an installed version of the software application is currently installed on the computerized equipment;
wherein the result of the update assessment operation indicates that a first newer version and a second newer version of the software application are available for installation on the computerized equipment, the second newer version having been released more recently than the first newer version;
wherein providing the electronic notification to the user includes:
supplying, as the electronic notification, an electronic instruction to the user which instructs the user to install the first newer version on the computerized equipment rather than the second newer version which was released more recently that the first newer version;
wherein the method further comprises:
after supplying the electronic instruction to the user, receiving an upgrade command from the user to install the first newer version on the computerized equipment rather than the second newer version which was released more recently that the first newer version, and installing the first newer version on the computerized equipment in place of the installed version of the software application to upgrade the software application;
wherein the computerized equipment is a data storage array having an array of storage devices;
wherein the method further comprises:
performing, on behalf of a set of host computers which is external to the computerized equipment, host initiated input/output (I/O) operations to store host data in and load host data from the array of storage devices while the computerized equipment performs the update assessment operation and provides the electronic notification to the user; and
wherein receiving the electronic communication containing the software version database includes:
acquiring a catalogue file containing version entries identifying the different versions of the software application, each version entry including a version identifier which uniquely identifies a respective version of the software application.

14. Computerized equipment, comprising:
a communications interface;
memory; and
control circuitry coupled to the communications interface and the memory, the memory storing instructions which, when carried out by the control circuitry, cause the control circuitry to:
receive, through the communications interface, an electronic communication containing a software version database which identifies different versions of a software application,
perform an update assessment operation on the software version database to determine whether there exists newer versions of the software application available for installation on the computerized equipment, and
provide an electronic notification to a user of the computerized equipment in response to a result of the update assessment operation indicating that there exists newer versions of the software application available for installation on the computerized equipment, the electronic notification identifying, for installation on the computerized equipment, a particular newer version of the newer versions of the software application available for installation on the computerized equipment;
wherein an installed version of the software application is currently installed on the computerized equipment;
wherein the result of the update assessment operation indicates that a first newer version and a second newer version of the software application are available for installation on the computerized equipment, the second newer version having been released more recently than the first newer version;
wherein the control circuitry, when providing the electronic notification to the user, is constructed and arranged to:
supply, as the electronic notification, an electronic instruction to the user which instructs the user to install the first newer version on the computerized equipment rather than the second newer version which was released more recently that the first newer version;
wherein the control circuitry is further constructed and arranged to:
after supplying the electronic instruction to the user, receive an upgrade command from the user to install the first newer version on the computerized equipment rather than the second newer version which was released more recently that the first newer version, and installing the first newer version on the computerized equipment in place of the installed version of the software application to upgrade the software application;

wherein the computerized equipment is a data storage array having an array of storage devices;

wherein the control circuitry is further constructed and arranged to:

perform, on behalf of a set of host computers which is external to the computerized equipment, host initiated input/output (I/O) operations to store host data in and load host data from the array of storage devices while the computerized equipment performs the update assessment operation and provides the electronic notification to the user; and wherein the control circuitry, when receiving the electronic communication containing the software version database, is constructed and arranged to:

acquire a catalogue file containing version entries identifying the different versions of the software application, each version entry including a version identifier which uniquely identifies a respective version of the software application.

15. Computerized equipment as in claim 14 wherein a status identifier of the version entry for the first newer version indicates that the first newer version is a "GoTo" version of the software application and a status identifier of the second newer version indicates that the second newer version is not the "GoTo" version of the software application; and wherein the control circuitry, when supplying the electronic instruction to the user, is constructed and arranged to:

prior to outputting the indication to the user to install the first newer version of the software application, search the software version database for the version entry with the status identifier indicating that the software version identified by the version identifier of that version entry is the "GoTo" version of the software application.

16. A method as in claim 1 wherein a status identifier of the version entry for the first newer version indicates that the first newer version is a "GoTo" version of the software application and a status identifier of the second newer version indicates that the second newer version is not the "GoTo" version of the software application; and wherein supplying the electronic instruction to the user further includes:

prior to outputting the indication to the user to install the first newer version of the software application, searching the software version database for the version entry with the status identifier indicating that the software version identified by the version identifier of that version entry is the "GoTo" version of the software application.

17. A computer program product as in claim 13 wherein a status identifier of the version entry for the first newer version indicates that the first newer version is a "GoTo" version of the software application and a status identifier of the second newer version indicates that the second newer version is not the "GoTo" version of the software application; and wherein supplying the electronic instruction to the user further includes:

prior to outputting the indication to the user to install the first newer version of the software application, searching the software version database for the version entry with the status identifier indicating that the software version identified by the version identifier of that version entry is the "GoTo" version of the software application.

\* \* \* \* \*